Oct. 14, 1947.   H. D. HUKILL   2,429,185

POWER STEERING MECHANISM

Filed Dec. 9, 1944

INVENTOR.
HENRY D. HUKILL
BY *H. W. Clayton*
ATTORNEY

Patented Oct. 14, 1947

2,429,185

UNITED STATES PATENT OFFICE 2,429,185

POWER STEERING MECHANISM

Henry D. Hukill, South Bend, Ind., assignor to Bendix Aviation Corporation, South Bend, Ind., a corporation of Delaware Application December 9, 1944, Serial No. 567,461

4 Claims. (Cl. 180—79.2)

This invention relates in general to steering mechanism and more particularly to steering mechanism for the dirigible wheels of an automotive vehicle.

It is an object of my invention to provide a simple and compact power means, cooperating with manually operated means, for actuating the front wheels of an automotive vehicle, said power means including a double-acting pressure differential operated motor controlled by a follow-up valve; it is a further object of my invention to combine, with this follow-up valve, so-called feel means for advising the driver of the vehicle just when the operation of the aforementioned power means is initiated.

Yet another object of my invention is to provide a combined power and manually operated means for actuating the front wheels of an automotive vehicle, said means being so constructed and so operative that the power means for actuating said wheels comes into play after, but only after, the resistance to movement of said wheels exceeds a certain factor.

A further object of my invention is to provide, in a manually and power operated steering mechanism for an automotive vehicle, force transmitting means interconnecting the drag link of the steering mechanism of said vehicle, the power element of a pressure differential operated motor, a part of the valve mechanism for controlling the operation of said motor and the steering wheel of said vehicle, said force transmitting means including two springs, one or the other of said springs being first operative, under normal driving conditions, to make possible a manual operation of the steering mechanism and then operative, by virtue of its expansion, to make possible a power operation of the steering mechanism when an appreciable force is necessary to turn the steering wheels.

Figure 1:
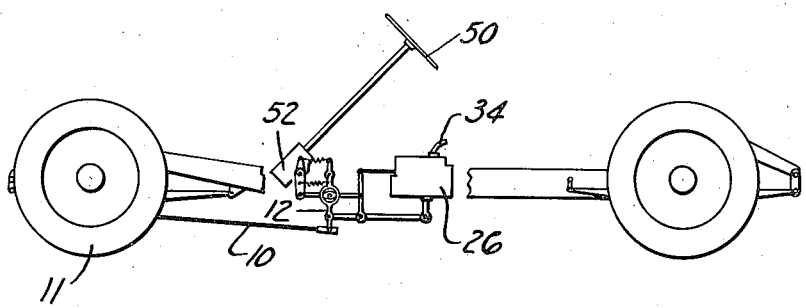
Figure 2:
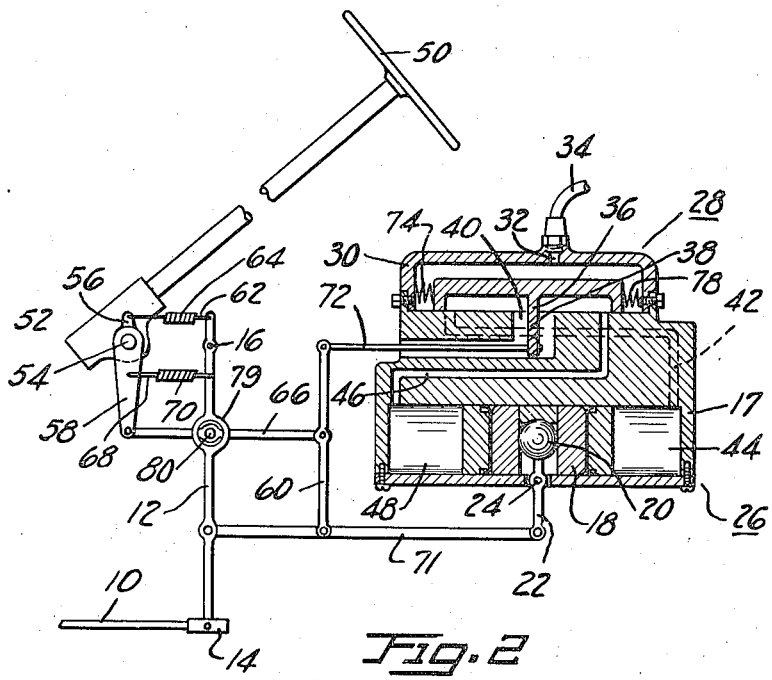

Other objects of the invention and desirable details of construction of parts will become apparent from the following detailed description of one embodiment of the invention, taken in conjunction with the accompanying drawing illustrating said embodiment, in which:

Figure 1 is a diagrammatic view disclosing the principal elements of the combined power and manually operated steering mechanism constituting my invention; and Figure 2 is a sectional view of the principal parts of the steering mechanism disclosed in Figure 1.

Referring now to the two figures of the drawing disclosing a preferred embodiment of my invention, a drag link 10 is connected to the usual steering mechanism, not shown, for effecting the steering movement of the front wheels of an automotive vehicle. One of said wheels 11 is shown in Figure 1. A power and manually operated pitman arm 12 is pivotally connected at one of its ends 14 to one end of the drag link 10 said arm being pivotally mounted upon a pin 16 fixedly connected to the chassis of the vehicle or a part secured thereto.

The power means for actuating the drag link 10 comprises a box shaped two-part casing 17 housing a two-part power element 18. As disclosed in Figure 2 the ball shaped end portion 20 of a lever 22 is mounted between the two parts of the power element 18, said lever being fulcrumed at 24 upon a pin secured to the casing. The casing and power element together constitute a pressure differential operated motor indicated as a whole in the figures of the drawing by the reference numeral 26.

The motor 26 is controlled by a valve mechanism 28 preferably detachably mounted upon the motor, all as disclosed in Figure 2. This valve mechanism includes a casing member 30 ported at 32 to receive a conduit 34 which conduit is preferably connected to a source of air pressure, for example a storage tank, not shown. A cup-shaped valve member 36, preferably rectangular in outline, is slidably mounted upon the outer face of the motor casing 17. A pin 38 secured to the inner surface of the valve member 36 extends through one end of an angular-shaped duct 40 in the motor casing 17, said duct serving to vent the interior of the valve to the atmosphere. A duct 42 within the motor casing serves to connect a compartment 44 of the motor 26 with the superatmospheric pressure source when the valve member 36 is moved to the right, Figure 2, to uncover one end of said duct 42; and a duct 46 serves to connect a compartment 48 of the motor 26 with said superatmospheric pressure source when the valve member 36 is moved to the left, Figure 2, to uncover one end of said duct 46.

Describing now the force transmitting means interconnecting the power element 18 of the motor, the valve member 36, the drag link 10, and steering wheel 50 of the vehicle, said force transmitting means comprises suitable steering wheel operated gearing housed within a casing 52, said gearing serving to rotate a shaft 54 either clockwise or counterclockwise depending of course, upon the direction of rotation of the steering wheel. To the shaft 54 there are keyed cranks 56 and 58, said cranks being connected respectively to one end of the pitman arm 12 and to the central portion of a floating lever 60. The means for connecting the crank 56 and pitman arm comprises a link 62 having a spring 64 incorporated therein; and a link 66 constitutes the means for interconnecting the lever 60 and the crank 58. The crank 58 and pitman arm are interconnected by a link 68 having incorporated therein a spring 70. A link 71, pivotally connected to the pitman arm 12 and the levers 60 and 22, and a link 72 interconnecting the pin 38 and the upper end of the lever 60, completes the aforementioned force transmitting means interconnecting the valve, the motor, the steering wheel and the drag link.

Describing now the operation of the combined manually and power operated mechanism constituting my invention, to effect a steering movement of the dirigible wheels 11 the steering wheel may be rotated to the right; and this operation serves say to rotate the shaft 54 clockwise. Now the clockwise rotation of the shaft 54 results in a corresponding angular movement of the cranks 56 and 58; and this operation, through the intermediary of the link 68 and spring 70 which are placed in tension, serves to rotate the pitman arm or lever 12 in a clockwise direction about its pivot 16. In this operation the spring 64 does not yield, that is does not expand.

The drag link 10 is thus moved to the left, Figure 2, to effect a steering movement of the wheels 11. In this operation the floating lever 60 rotates about its pivotal connection with the link 72, the latter being connected with the aforementioned valve operating pin 38. A spring 74, interposed between the valve member 36 and a portion of the valve casing 30, is of such strength as to insure this operation, that is insure the immobility of the valve 36 during the first increment of movement of the drag link 10. Now it is to be particularly noted that this initial movement of the drag link is effected solely by the physical effort of the driver there being no operation of the valve to effect an energization of the motor 26.

To effect the opposite turning movement of the front wheels 11 the steering wheel is, of course, rotated in the other direction; and this operation serves to rotate the shaft 54 counterclockwise and the cranks 56 and 58 keyed thereto. The drag link 10 is thus bodily moved to the right, Figure 2, to effect a steering movement of the front wheels, it being noted that a spring 78, a duplicate of the aforementioned spring 74, serves, during this operation, to insure a fulcruming of the lever 60 at its connection with the link 72.

Now with all normal driving of the vehicle, say near the crown of a paved or cement highway, the steering movement of the front wheels is effected as described above, that is solely by the physical effort of the driver. However when an unsual amount of force is necessary to turn the vehicle, say when the vehicle is parked in muddy ground, then it is necessary to bring into play the power means of my invention; and this is effected when the force necessary to turn the steering wheels exceeds the force necessary to elongate either the spring 64 or the spring 70 depending, of course, on the steering operation being effected. Should such a steering force be necessary to turn the wheels then with one of the turning operations the spring 64 is elongated, the pitman arm 12 remaining stationary. With this operation the crank 58, which is rotated counterclockwise, serves to move the link 66; and this operation serves to rotate the lever 60 about its pivotal connection with the link 71 thereby opening the valve 36. To make this operation possible, the spring 78 is of such a strength and the remainder of the force transmitting means is so constructed, that said spring will be collapsed by a force which is equal to or substantially equal to the force necessary to elongate the spring 64. It is, of course, also true that when the spring 70 is elongated the spring 74 is collapsed to effect an opening of the valve 36.

Now with the opening of the valve, it being assumed that the valve member 36 is moved to the right to uncover the duct 42 the motor 26 is energized. Describing this operation, when the duct 42 is uncovered, the motor compartment 44 is connected with the source of air pressure thereby effecting a movement of the power element 18 to the left, Figure 2. The motor compartment 48 is at this time vented to the atmosphere via the ducts 40 and 46, accordingly, the above described power operation is effected; for the power element is then subjected to a differential of pressures. Now the movement of the power element 18 to the left serves to rotate the lever 22 counterclockwise thereby bodily moving the link 71; and this operation serves, through the intermediary of the angularly moved pitman arm, to effect a movement of the drag link 10 to the right.

It is apparent, therefore, that when the spring 64 is elongated by a counterclockwise rotation of the crank 56, the operation of the power means is initiated to effect a rightward movement of the drag link 10.

If the driver wishes to supplement the force exerted by the motor 26 with his own physical effort he can, in the above described operation, do so by rotating crank 58 far enough to bring a pin 80 into contact with a wall of an enlarged portion 79 of the pitman arm 12. The pin 80, which is mounted in the link 66, extends through an opening in said enlarged portion 79. It is apparent, therefore, that after the lost motion between the pin 80 and the portion 79 is taken up, then continued rotation of the crank 58 will effect a manual loading of the drag link 10 which loading supplements the then existing power loading of said link.

The driver may effect a power operation of the wheels 11 in a succession of steps and to accomplish this result he arrests the movement of the steering wheel after the same is moved sufficiently to open the valve 36. The lever 60, operated by the power element 18 and operating as a lever of the first class, then rotates about its connection with the link 66; and this operation serves to reverse the direction of movement of the valve member 36 to lap the valve, that is cover the upper end of the duct 42. The movement of the power element 18 and the wheels 11 connected thereto is then arrested when the system is in equilibrium. To resume the movement of the steering wheels 11, the driver resumes the movement of the steering wheel to again crack the valve to again energize the motor 26.

The above described operation of the steering mechanism constituting my invention concerned the steering movement of the front wheels in one direction, however, it will be apparent from an inspection of Figure 2 of the drawings that the operation of said mechanism to effect the steering movement of said wheels in the opposite direction is just the reverse of the above described operation. In other words, if the steering wheel is rotated to effect a clockwise rotation of the cranks 56 and 58 and pitman arm 12, then the valve 36 is moved to the left, Figure 2, to uncover the duct 46; and this operation results in an energization of the motor 26 to move the drag link 10 to the left.

There is thus provided a combined power and manually operated steering mechanism for effecting the steering operation of the front wheels of an automotive vehicle. With the mechanism of my invention, by virtue of the operation of the springs 64 and 70, most of the steering operations are performed solely by the physical effort of the driver. However when the steering becomes difficult, that is when a substantial force is necessary to turn the front wheels, then the power means of my invention is brought into play to either of itself or aided by the physical effort of the driver, effect the steering operation. The pressure differential operated motor of my invention is controlled by a follow-up valve and the aforementioned springs 64 and 70 provide a so-called feel means to advise the driver when the power means is brought into operation.

Although the invention has been described in connection with a certain specific embodiment of my invention the principles involved are susceptible of numerous other applications that will readily occur to persons skilled in the art. The invention is therefore to be limited only as indicated by the appended claims.

I claim:

1. In an automotive vehicle provided with a steering wheel, dirigible wheels and means for operating said wheels to steer the vehicle said means including a drag link and manually and power operated means for moving said drag link comprising a pressure differential operated motor including a casing and a power element, follow-up valve means, including a movable valve member, for controlling the operation of said motor and force transmitting means interconnecting the drag link, the movable valve member, the power element and the steering wheel, said force transmitting means including a plurality of cranks and a pitman arm and further including two springs interconnecting said cranks and pitman arm one or the other of said springs being operative by either resisting expansion or being expanded, to make possible respectively, a manual operation of the first mentioned means or a power operation thereof.

2. In an automotive vehicle provided with a steering wheel, dirigible wheels and means, including a drag link, for operating said wheels to steer the vehicle, manually and power operated means for moving said drag link comprising a pressure differential operated motor including a casing and a power element, valve means, including a movable valve member, for controlling the operation of said motor and force transmitting means interconnecting the drag link, the movable valve member, the power element and the steering wheel, said force transmitting means including a shaft rotated by means operated by the steering wheel, two cranks each keyed to said shaft, a pitman arm, means, including two springs, connecting said pitman arm with the two cranks, and linkage means interconnecting one of said cranks, the power element, the movable valve member and the pitman arm said linkage means serving to effect a follow-up to lap operation of the valve and to transmit the power load from the power element to the pitman arm.

3. In an automotive vehicle provided with a steering wheel, dirigible wheels and means, including a drag link, for operating said wheels to steer the vehicle, manually and power operated means for moving said drag link comprising a pressure differential operated motor including a casing and a power element, valve means, including a movable valve member, for controlling the operation of said motor and force transmitting means interconnecting the drag link, the movable valve member, the power element and the steering wheel, said force transmitting means including a shaft rotated by means operated by the steering wheel, two cranks each keyed to said shaft, a pitman arm pivotally connected to the drag link, means, including two springs interconnecting said pitman arm with the two cranks, and linkage means interconnecting one of said cranks, the power element, the movable valve member and the pitman arm the parts of said force transmitting means being so constructed and arranged and so operative that with a succession of movements of the steering wheel there results, by virtue of a follow-up to lap operation of the valve means, a succession of operations of the motor to effect a steering movement of the dirigible wheels.

4. In an automotive vehicle provided with a steering wheel, two dirigible wheels, and means, including a drag link, for operating said wheels to effect the steering of the vehicle, power and manually operated means for bodily moving said drag link including a double-acting pressure differential operated motor, valve means for controlling the operation of said motor and force transmitting means interconnecting the valve means, the power element of the motor, the aforementioned drag link and the steering wheel, said force transmitting means including a pitman arm, a steering wheel operated crank shaft, two cranks keyed to said shaft, means, including a spring, interconnecting one of said cranks with the pitman arm, means, including a spring, interconnecting the other of said cranks with the pitman arm and means interconnecting one of said cranks, a part of the valve means, the pitman arm and the power element of the motor, the parts of said force transmitting means being so constructed and arranged and so operative that with a succession of movements of the steering wheel there results, by virtue of a follow-up to lap action of the valve mechanism, a succession of operations of the motor to effect a steering movement of the dirigible wheels.

HENRY D. HUKILL.

REFERENCES CITED

The following references are of record in the file of this patent:

UNITED STATES PATENTS

| Number | Name | Date |
|---|---|---|
| 2,051,816 | Bragg | Aug. 25, 1936 |

FOREIGN PATENTS

| Number | Country | Date |
|---|---|---|
| 747,960 | France | Apr. 4, 1933 |